US010211668B2

(12) United States Patent
Lucrecio et al.

(10) Patent No.: US 10,211,668 B2
(45) Date of Patent: Feb. 19, 2019

(54) AUDIO TRANSMISSION AND CHARGING SYSTEM AND METHOD OF USE

(71) Applicant: Flextronics AP, LLC, San Jose, CA (US)

(72) Inventors: Armando J. Lucrecio, Fremont, CA (US); Jiayin Ma, Palo Alto, CA (US); Shaily Deva, Saratoga, CA (US)

(73) Assignee: Flextronics AP, LLC, San Jose, CA (US)

( * ) Notice: Subject to any disclaimer, the term of this patent is extended or adjusted under 35 U.S.C. 154(b) by 282 days.

(21) Appl. No.: 15/134,138

(22) Filed: Apr. 20, 2016

(65) Prior Publication Data

US 2017/0018957 A1 Jan. 19, 2017

Related U.S. Application Data

(60) Provisional application No. 62/193,037, filed on Jul. 15, 2015, provisional application No. 62/210,303, filed on Aug. 26, 2015, provisional application No. 62/212,844, filed on Sep. 1, 2015, provisional application No. 62/214,362, filed on Sep. 4, 2015, provisional application No. 62/216,861, filed on Sep. 10, 2015, provisional application No. 62/195,726, filed on Jul. 22, 2015, provisional application No. 62/197,321, filed on Jul. 27, 2015.

(51) Int. Cl.
*H02J 7/35* (2006.01)
*H04B 10/50* (2013.01)

(52) U.S. Cl.
CPC .............. *H02J 7/35* (2013.01); *H04B 10/503* (2013.01); *Y02E 10/566* (2013.01)

(58) Field of Classification Search
CPC ......... H02J 7/35; H04B 10/503; Y02E 10/566
USPC .......................... 320/101, 107, 114; 398/138
See application file for complete search history.

(56) References Cited

U.S. PATENT DOCUMENTS

| 5,865,733 A * | 2/1999 | Malinouskas ........ A61B 5/0011 128/903 |
| 7,621,677 B2 | 11/2009 | Yang et al. |
| 2004/0142733 A1 | 7/2004 | Parise |
| 2004/0266367 A1 | 12/2004 | Tuominen et al. |
| 2007/0031089 A1 | 2/2007 | Tessnow et al. |
| 2007/0069684 A1 | 3/2007 | Ramsden |

(Continued)

FOREIGN PATENT DOCUMENTS

| DE | 69634441 | 4/2006 |
| DE | 102012018616 | 3/2014 |
| WO | WO 2009/045188 | 4/2009 |

OTHER PUBLICATIONS

Official Action (with translation) for German Patent Application No. 102016113142.3, dated Jan. 12, 2018 10 pages.

(Continued)

*Primary Examiner* — Edward Tso
*Assistant Examiner* — Aaron Piggush
(74) *Attorney, Agent, or Firm* — Sheridan Ross P.C.

(57) ABSTRACT

Techniques for charging and communication with electronic devices, such as headphones, are provided. Specifically, systems and methods to provide charging of, and communication with, audio devices, such as by photovoltaic (PV) cells, infrared (IR) illumination, audio signals, and LEDs such as laser LEDs, are disclosed.

20 Claims, 3 Drawing Sheets

(56) References Cited

U.S. PATENT DOCUMENTS

| | | | |
|---|---|---|---|
| 2010/0054748 A1* | 3/2010 | Sato | H04B 10/1149 398/130 |
| 2011/0261354 A1 | 10/2011 | Sinfield | |
| 2013/0314028 A1 | 11/2013 | Tseng | |
| 2014/0132201 A1 | 5/2014 | Tsang | |
| 2014/0217955 A1 | 8/2014 | Lin et al. | |
| 2016/0108728 A1 | 4/2016 | Freese et al. | |
| 2016/0134794 A1 | 5/2016 | Grabau et al. | |
| 2017/0019180 A1 | 1/2017 | Lucrecio et al. | |
| 2017/0059763 A1 | 3/2017 | Lucrecio et al. | |
| 2017/0070292 A1 | 3/2017 | Lucrecio et al. | |

OTHER PUBLICATIONS

Notice of Allowance for U.S. Appl. No. 15/134,084, dated Nov. 16, 2017, 7 pages.
Official Action for German Patent Application No. 102016113142.3, dated Apr. 13, 2017 15 pages.
Official Action for U.S. Appl. No. 15/134,084, dated Jun. 29, 2017, 11 pages.

\* cited by examiner

AUDIO TRANSMISSION AND CHARGING SYSTEM AND METHOD OF USE

CROSS REFERENCE TO RELATED APPLICATIONS

The present application claims the benefits of and priority, under 35 U.S.C. § 119(e), to U.S. Provisional Application Ser. Nos. 62/193,037, filed on Jul. 15, 2015, entitled "Remote Device Charging;" 62/210,303, filed on Aug. 26, 2015, entitled "Diffusive Optical Fiber as Ambient Light Sensors, Optical Signal Transceiver, Proximity Sensor," 62/212,844, filed on Sep. 1, 2015, entitled "Diffusive Optical Fiber as Ambient Light Sensors, Optical Signal Transceiver, Proximity Sensor," 62/214,362, filed on Sep. 4, 2015, entitled "Laser Charging and Optical Bi-Directional Communications Using Standard USB Terminals," 62/216,861, filed on Sep. 10, 2015, entitled "Diffusive Optical Fiber as Ambient Light Sensors, Optical Signal Transceiver, Proximity Sensor," 62/195,726, filed on Jul. 22, 2015, entitled "Remote Device Charging," and 62/197,321, filed on Jul. 27, 2015, entitled "Device Communication, Charging and User Interaction."

This application is also related to U.S. patent application Ser. Nos. 14/937,553, filed on Nov. 10, 2015, entitled "Laser and Optical Charging and Communications Device and Method of Use," Ser. No. 14/942,210, filed Nov. 16, 2015, entitled "LED and Laser Light Coupling Device and Method of Use," and Ser. No. 15/134,084, filed on Apr. 20, 2016, entitled "Optical Communication and Charging Device and Method of Use," the entire disclosures of which are hereby incorporated by reference, in their entirety, for all that they teach and for all purposes.

FIELD

The disclosure relates generally to audio transmission and charging, such as optical charging of audio devices and optical transmissions with audio devices.

BACKGROUND

Techniques for charging and communication with electronic devices, such as headphones, are provided. Specifically, systems and methods to provide charging of, and communication with, audio devices, such as by photovoltaic (PV) cells, infrared (IR) illumination, audio signals, and LEDs such as laser LEDs, are disclosed.

By way of providing additional background, context, and to further satisfy the written description requirements of 35 U.S.C. § 112, the following references are incorporated by reference in their entireties: U.S. Pat. Pub. Nos. 2013/0314028 to Tseng; 2014/0132201 to Tsang, U.S. Pat. Pub. No. 2007/0031089 to Tessnow and U.S. Pat. No. 7,621,677 to Yang.

SUMMARY

Systems and methods for audio transmission and charging, such as optical charging of audio devices and optical transmissions with audio devices, are disclosed. Specifically, systems and methods to provide charging of devices, such as, charging by photovoltaic (PV) cells, infrared (IR) illumination, audio signals, and LEDs such as laser LEDs to charge devices such as headphones are presented.

In one embodiment, an audio transmission and charging system is disclosed, the system comprising: a transmitter/charger configured to transmit an optical signal by a light source; and an audio device comprising a battery and a PV cell in communication with the battery, the PV cell configured to receive the optical signal; wherein the PV cell converts the received optical signal into electrical power, wherein the electrical power is provided to the battery, wherein the battery is charged.

In another embodiment, a method of audio communications and charging, the method comprising: providing an audio transmission and charging system comprising: a transmitter/charger configured to transmit an optical signal by a light source; an audio device comprising a battery and a PV cell in communication with the battery, the PV cell configured to receive the optical signal; and at least one fiber optic cable interconnected between the transmitter/charger device and the audio device; transmitting the optical signal from the transmitter/charger to the audio device by way of the at least one fiber optic cable; receiving, by the audio device, the optical signal; determining if the audio device requires charging, wherein if the audio device requires charging, converting the optical signal to an electrical signal, the electrical signal provided to the battery wherein the battery is charged.

In yet another embodiment, an audio optical transmission and optical charging device is disclosed, the device comprising: an optical transmitter/charger configured to transmit a first optical signal by an LED light source, the first optical signal comprising a modulated first communications signal; an audio device comprising a battery and a PV cell in communication with the battery, the PV cell configured to receive the optical signal, the PV cell further configured to demodulate the modulated first communications signal; and at least one fiber optic cable, the at least one fiber optic cable interconnected to the transmitter/charger and to the audio device, the at least one fiber optic cable carrying the first optical signal transmitted by the transmitter/charger to the audio device; wherein the PV cell converts at least a portion of the received optical signal into electrical power, wherein the electrical power is provided to the battery, wherein the battery is charged.

In further embodiments, the device, system and/or method comprise wherein the light source is a laser/LED diode; wherein the optical signal comprises a first modulated communications signal; wherein the first modulated communications signal is an audio signal; wherein the audio device further comprises a lens configured to receive and transfer the optical signal to the PV cell; further comprising at least one fiber optic cable, the at least one fiber optic cable carrying the optical signal transmitted by the transmitter/charger to the audio device; wherein the audio device is further configured to transmit, by the at least one fiber optic cable, a second modulated communications signal to the transmitter/charger; wherein the optical signal comprises data to enable a software update of the audio device; wherein the transmitter/charger further comprises a microprocessor/controller configured to manage the first and the second modulated communications signals; and wherein the audio device further comprises a demodulator to demodulate the modulated first communications signal.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Figure 1:
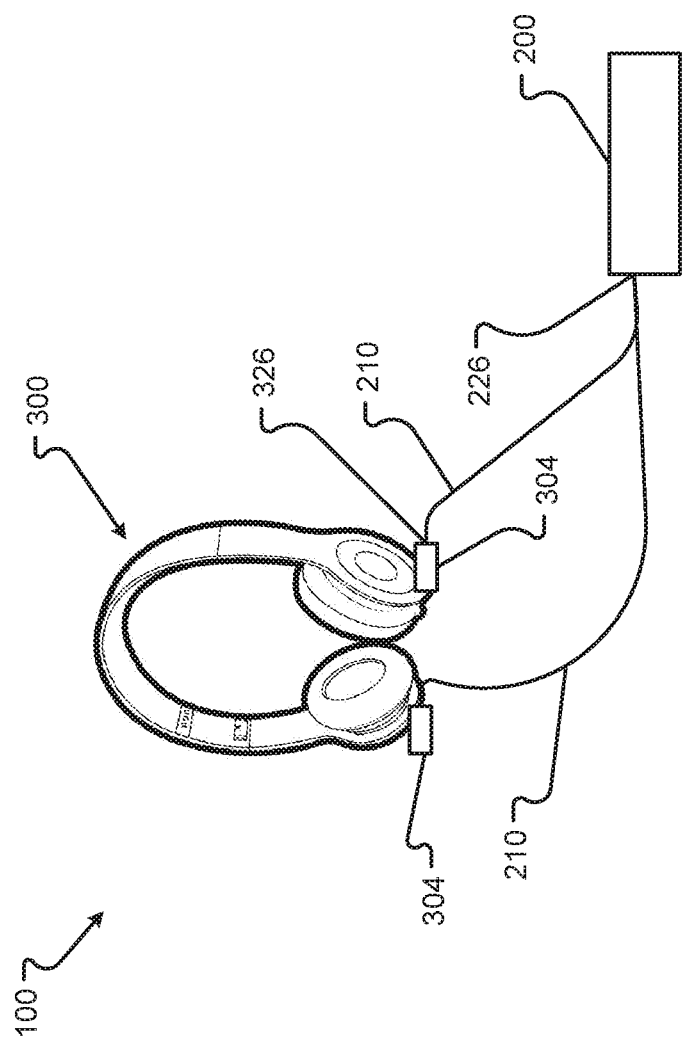
FIG. 1 provides a representation of one embodiment of the audio transmission and charging system.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Number | Component |
| --- | --- |
| 100 | System |
| 200 | Charge/Communication Device |
| 210 | Fiber Optic Cable |
| 226 | Charge/Communication Device Port |
| 230 | Light Transmitter Power |
| 250 | Microprocessor/Controller One |
| 260 | LED Transmitter/Receiver |
| 284 | (Bi-directional) Optical Communication One |
| 300 | Audio Device |
| 304 | Audio Device Component One |
| 306 | Audio Device Internal Signal |
| 308 | Audio Device Component Two |
| 310 | Microprocessor/Controller Two |
| 312 | Audio Device Solar Cells |
| 326 | Audio Device Port |
| 370 | Audio Device LED |

DETAILED DESCRIPTION

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

The term "PV" means photovoltaic and generally refers to a means or method of converting light or solar energy into electricity.

The term "PV array" means at assembly of PV cells or modules.

The term "USB" means universal serial bus and refers to hardware, such as cables and connectors, and communications protocols used in a bus for connection, communication and/or power transfer.

The term "USB protocol" means a USB communication protocol.

The term "USB connector" or "USB hardware connector" refers to a physical USB connector.

The term "wireless USB" refers to wireless communication using USB protocols.

The term "modulation" refers to the process of varying properties of a waveform or carrier signal with a modulating signal that contains information to be transmitted.

The term "demodulation" refers to the process of extracting the original information-bearing signal from the modulated waveform or carrier signal.

The term "modulator" refers to a device that performs modulation.

The term "demodulator" refers to a device that performs demodulation.

The term "LED" means Light-Emitting Diode and refers to a semiconductor that converts an electrical current into light, and includes all available LEDs types such as surface-emitting LEDs and edge-emitting LEDs.

The term "light coupling" means providing or supplying light to or into a fiber.

The term "waveguide" means a structure that guides waves of light.

The term "fiber optics" or "optical fiber" means a flexible, transparent fiber made by drawing glass/silica or plastic.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Figure 2:
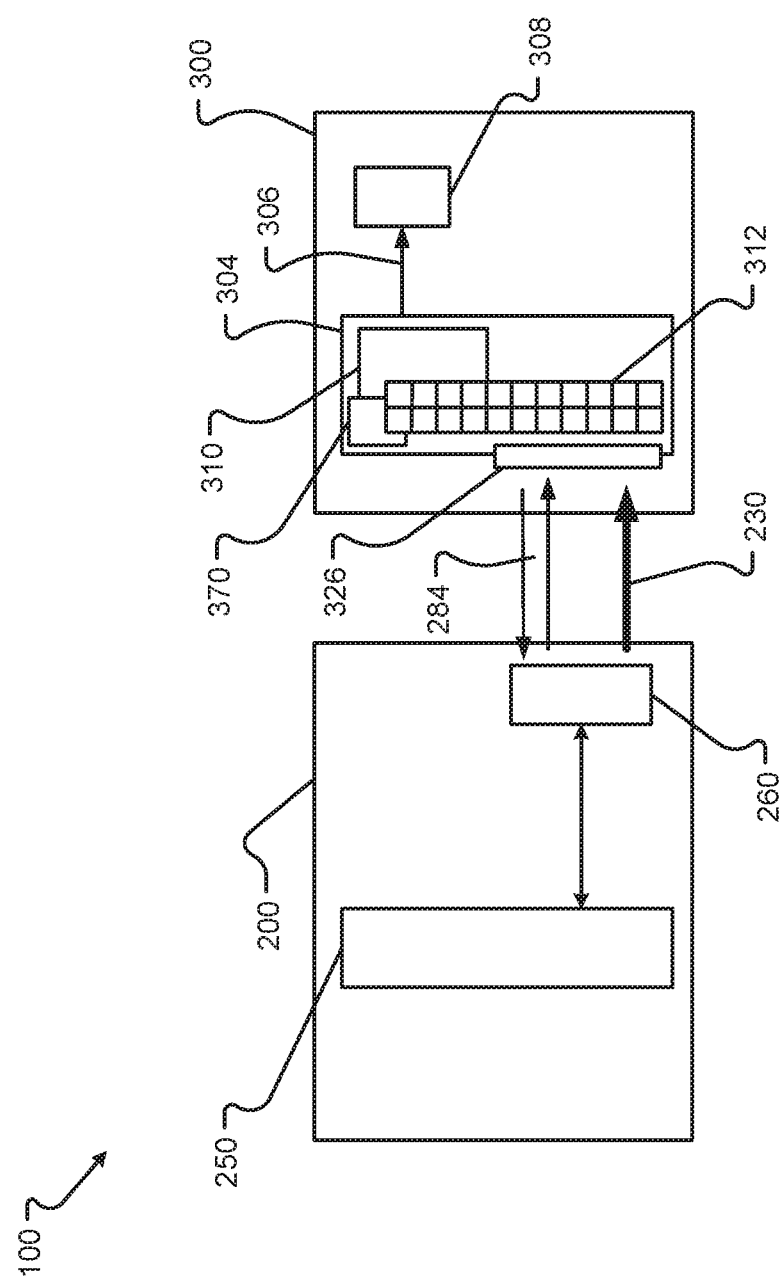
FIG. 2 provides a block diagram of the embodiment of the audio transmission and charging system of FIG. 1.

With focus on FIGS. 1 and 2, embodiments of the audio transmission and charging system 100 are depicted. Generally, the system 100 comprises a charge/communication device 200 and an audio device 300, the charge/communication device 200 and the audio device 300 interconnected by way of a fiber optic cable 210. The charge/communication device 200 sends an optical signal to the audio device 300 that is received by the audio device solar cells 312, which may comprise PV cells. The PV cells may convert the received optical signal's energy to electrical energy, which may be passed within the audio device 300 as audio device internal signal 306. Converted electrical audio device internal signal 306 may be provided to a battery of the audio device 300 for charging. One or more fiber optic cables 210 physical run from one or more charge/communication device ports 226 to audio device 300, in one embodiment interconnected to one or more audio device ports 326. An optical signal emitted or transmitted by the charge/communication device 200 that is destined to be converted to an electrical (power) signal is depicted in FIG. 2 as light transmitter power 230.

Alternatively or additionally, the system 100 of charge/communication device 200 may provide an audio feed or signal to audio device 300. That is, the charge/communication device 200 may send a modulated optical signal to the audio device 300 that is received by the audio device solar cells 312 and/or components of the audio device component one 304, wherein the modulated incoming (or received) optical communication one 284 signal is demodulated and employed to drive the audio of the audio device 300. Audio device component one 304 comprises audio device solar cells 312 (which may comprise PV cells), audio device port 326, audio device LED 370 and microprocessor/controller two 310. The demodulation of the incoming or received optical communication signal may occur in any one or components of the audio device component one 304, e.g. the audio device solar cells 312 may demodulated the optical audio communication signal, and/or a dedicated demodulator may be employed. Audio device component one 312 may perform additional functions or operations to incoming or received optical communication one 304 signal, such as amplification, signal processing to improve signal to noise ratio, and any process known to those skilled in the art. An optical signal emitted or transmitted by the charge/communication device 200 that is destined to be used for communication purposes (such as transmission of a modulated audio signal) is depicted in FIG. 2 as optical communication one 284.

Optical communication one 284 signal may be bi-directional, that is, the signal may provide 2-way optical communication between charge/communication device 200 and audio device 300. As such, each of the audio device 300 and the charge/communication may comprise a transmitter, a receiver, a transceiver, a modulator and demodulator. Examples of bi-directional optical communications between charge/communication device 200 and audio device 300 include status queries, such as charge level of audio device or a specific query if charging is desired, a query to audio device 300 by charge/communication device 200 as to whether audio device 200 seeks receipt of an optical audio signal, and how audio device will demodulate incoming audio or communication signal (eg if by way of solar cells 312 or a dedicated modulator, protocols for communication may differ). Audio device 300 may transmit optical communications (e.g. a modulated optical signal) by way of audio device LED 370, and charge/communication device 200 may receive optical communication 284 from audio device 300 with aid of a PV cell or other solar cell.

Any modulator of audio device 300 and/or charge/communication device 200 may modulate an optical signal in any manner known to those skilled in the art, to include as amplitude modulation, phase modulation and/or polarization modulation.

In one embodiment, solar cells receive laser light emitted from an LED (in some embodiments after passing through a lens) by way of a diffuser film.

The optical communication one 284 signal may function as a safety device wherein one or more LEDs are only activated if a positive or affirmative "handshake" is provided wherein receipt of LED signal is available, expected and/or desired.

The electrical power output by solar cells 312 may comprise any format as known to those skilled in the art, to include 120 Volt at 60 Hz and 230 Volt at 50 Hz. In one embodiment the electrical power output by solar cells 312 is of USB protocol.

In one embodiment, one or both of charge/communication device 200 and audio device 300 comprise a USB interface, employ USB protocols, wireless USB, and any USB hardware interface known to those skilled in the art, to include micro-USB, mini-USB and standard USB hardware interfaces.

In another embodiment, the charge/communication device 200 receives power from an external device, such as any commercially available electronic device, such as a laptop computer, personal computer, and smartphone.

In one embodiment, the charge/communication device 200 comprises its own power supply, such as a battery such as a lithium battery, so as to power the laser/LED and provide any set of functions disclosed above, such as charging and optical communication.

In one embodiment, the charge/communication device 200 may operate in any of three selectable modes: power charging only, optical communications only, and both power charging and optical communications.

In one embodiment, microprocessor/controller one 250 manages and/or controls optical signal output, to include optical signal communications and modulation of optical signal output, and/or received optical communication to include demodulation. In one embodiment, microprocessor/controller two 310 manages and/or controls optical signal output, to include optical signal communications and modulation of optical signal output, and/or received optical communication to include demodulation.

In one embodiment, the charge/communication device 200 outputs bi-directional optical communications 284 with the audio device 300, wherein the optical communications comprise communication protocols optimized for selectable parameters, e.g. unique communication protocols or settings for a particular audio device 300 or capabilities of the audio device 300. In one embodiment, the charge/communication device comprises a selectable database wherein unique communication protocols and/or settings are established based on the type of audio device engaged (such protocols or settings may be provided via a query between charge/communications device 200 and audio device 300 as disclosed above). Furthermore, the specialized or optimized communication protocols may be tuned to optically communicate with (or charge) an audio device by the charge/communication device 200.

The audio device 300 may be any commercially available audio device, such as, headphones, ear buds, and others know to those skilled in the art. Although interaction with an audio device 300 has been emphasized, the system may interact with other external devices known to those skilled in the art, such as smartphone and laptops, for, among other things, optical communication, charging and driving of audio.

Figure 3:
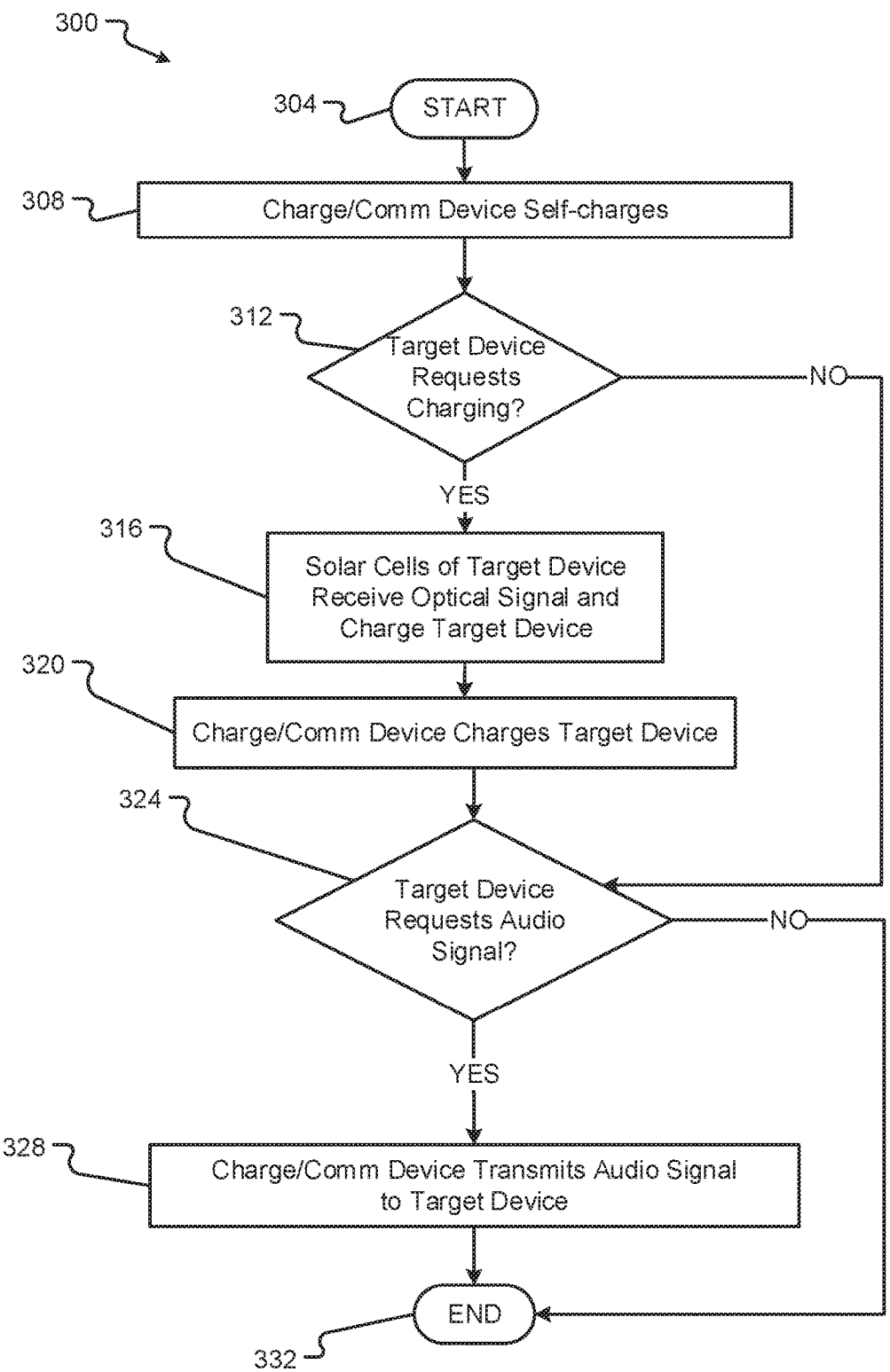
FIG. 3 provides a flow chart of a method of use of the audio transmission and charging system of FIGS. 1 and 2.

With reference to FIGS. 1 and 2, FIG. 3 provides a flow chart illustrating an exemplary method of use of the audio transmission and charging system 100. Generally, the method 300 starts at step 304 and ends at step 332. The method 300 can include more or fewer steps or can arrange the order of the steps differently than those shown in FIG. 3.

At step 308 the charge/communications device 200 self-charges, i.e. the charge/communications device 200 ensures it has enough power available to charge an external device such as audio device 300. At step 312, the charge/communications device 200 queries the target device (e.g. audio device 300) as to whether the target device requires charging. Such query may be provided via optical communication one 284. If the result of the query is Yes, the method 300 proceeds to step 316. if the result of the query of step 312 is No, the method 300 proceeds to step 324.

At step 316, the charge/communications device 200 transmits an optical signal to target device. For example, the charge/communications device 200 transmits an optical signal to audio device 300 by way of LED transmitter/receiver 260, the optical signal received by solar cells 312 and converted to an electrical signal wherein a battery of audio device 300 is charged.

At step 324, the charge/communications device 200 queries the target device (e.g. audio device 300) as to whether the target device requires receipt of an audio optical (modulated) signal. Such query may be provided via optical communication one 284. If the result of the query is Yes, the method 300 proceeds to step 328. if the result of the query of step 324 is No, the method 300 proceeds to step 332.

At step 328, the charge/communications device 200 transmits an optical audio signal to target device. For example, the charge/communications device 200 transmits an optical signal to audio device 300 by way of LED transmitter/receiver 260, the optical signal received by solar cells 312 and demodulated wherein an audio signal is provided to audio device 300 so as to "drive" the audio device 300. The method 300 ends at step 332.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for laser and optical charging and communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. An audio transmission and charging system comprising:
   a transmitter/charger that transmits an optical query signal by a light source; and
   an audio device comprising a battery and a PV cell in communication with the battery, the PV cell configured to receive the optical query signal, wherein the optical query signal includes an audio device status query that initiates two-way optical communication between the transmitter/charger and the audio device, wherein, in response to receiving the status query, the audio device sends a status of the optical device and information about a communication protocol for the two-way optical communication, and wherein the transmitter/charger transmits an optical signal by the light source via the communication protocol;

wherein the PV cell converts the transmitted optical signal received into electrical power when the status indicates that the audio device requires charging, wherein the electrical power is provided to the battery, and wherein the battery is charged.

2. The system of claim 1, wherein the light source is a laser/LED diode.

3. The system of claim 2, wherein the optical signal comprises a first modulated communications signal.

4. The system of claim 3, wherein the first modulated communications signal is an audio signal.

5. The system of claim 4, wherein the audio device further comprises a lens configured to receive and transfer the optical signal to the PV cell.

6. The system of claim 3, further comprising at least one fiber optic cable, the at least one fiber optic cable carrying the optical signal transmitted by the transmitter/charger to the audio device.

7. The system of claim 6, wherein the audio device is further configured to transmit, by the at least one fiber optic cable, a second modulated communications signal to the transmitter/charger.

8. The system of claim 1, wherein the optical signal comprises data to enable a software update of the audio device.

9. The system of claim 7, wherein the transmitter/charger further comprises a microprocessor/controller configured to manage the first and the second modulated communications signals.

10. A method of audio communications and charging, the method comprising:
providing an audio transmission and charging system comprising: a transmitter/charger configured to transmit an optical query signal by a light source; an audio device comprising a battery and a PV cell in communication with the battery, the PV cell configured to receive the optical query signal, wherein the optical query signal includes an audio device status query that is configured to initiate two-way optical communication between the transmitter/charger and the audio device, wherein, in response to receiving the audio device status query, the audio device sends a status of the optical device and information about a communication protocol for the two-way optical communication, and wherein the transmitter/charger is configured to transmit an optical signal by the light source via the communication protocol; and at least one fiber optic cable interconnected between the transmitter/charger device and the audio device;
transmitting the optical signal from the transmitter/charger to the audio device by way of the at least one fiber optic cable;
receiving, by the audio device, the optical signal; and
determining, based on the status, if the audio device requires charging, wherein if the audio device requires charging, converting the optical signal to an electrical signal, the electrical signal provided to the battery wherein the battery is charged.

11. The method of claim 10, wherein the light source is a laser/LED diode.

12. The method of claim 11, wherein the optical signal comprises a first modulated communications signal.

13. The method of claim 12, wherein the first modulated communications signal is an audio signal.

14. The method of claim 13, wherein the PV cell converts the received optical signal to an electrical signal.

15. The method of claim 14, wherein the audio device is further configured to transmit, by the at least one fiber optic cable, a second modulated communications signal to the transmitter/charger.

16. The method of claim 10, wherein the optical signal comprises data to enable a software update of the audio device.

17. The method of claim 15, wherein the transmitter/charger further comprises a microprocessor/controller configured to manage the first and the second modulated communications signals.

18. An audio optical transmission and optical charging device comprising:
an optical transmitter/charger that transmits optical signals by an LED light source including an optical query signal;
an audio device comprising a battery and a PV cell in communication with the battery, wherein the PV cell receives the optical query signal, wherein the optical query signal includes an audio device status query that initiates two-way optical communication between the optical transmitter/charger and the audio device, wherein, in response to receiving the status query, the audio device sends a status of the optical device and information about a communication protocol for the two-way optical communication, and wherein the optical transmitter/charger transmits a modulated optical signal by the light source via the communication protocol; and
at least one fiber optic cable, the at least one fiber optic cable being interconnected to the optical transmitter/charger and to the audio device and the at least one fiber optic cable carrying the optical query signal transmitted by the optical transmitter/charger to the audio device;
wherein the PV cell converts at least a portion of the transmitted modulated optical signal received into electrical power when the status indicates that the audio device requires charging, wherein the electrical power is provided to the battery, and wherein the battery is charged.

19. The device of claim 18, wherein the modulated optical signal includes an audio signal.

20. The device of claim 19, wherein the audio device further comprises a demodulator to demodulate the modulated optical signal.

* * * * *